United States Patent
Hu et al.

(10) Patent No.: US 7,274,993 B2
(45) Date of Patent: Sep. 25, 2007

(54) METHOD FOR FORMING AN OPTIMUM STOCHASTIC MODEL OF A HETEROGENEOUS UNDERGROUND ZONE, CALIBRATED WITH DYNAMIC DATA BY PARAMETRIZATION OF CONTINUOUS DISTRIBUTIONS

(75) Inventors: Lin-Ying Hu, Rueil Malmaison (FR); Darryl Fenwick, Los Altos Hills, CA (US)

(73) Assignee: Institut Francais du Petrole, Malmaison Cedex (FR)

( * ) Notice: Subject to any disclaimer, the term of this patent is extended or adjusted under 35 U.S.C. 154(b) by 295 days.

(21) Appl. No.: 10/992,793

(22) Filed: Nov. 22, 2004

(65) Prior Publication Data
US 2005/0172699 A1 Aug. 11, 2005

(30) Foreign Application Priority Data
Nov. 20, 2003 (FR) .................................. 03 13694

(51) Int. Cl.
*G01V 1/28* (2006.01)
*G06F 19/00* (2006.01)
(52) U.S. Cl. .......................................... 702/14; 702/1
(58) Field of Classification Search .................. 703/2; 702/1–12
See application file for complete search history.

(56) References Cited

U.S. PATENT DOCUMENTS 6,618,695 B1 * 9/2003 Hu et al. ..................... 703/2
6,813,565 B1 * 11/2004 Hu et al. ..................... 702/14

FOREIGN PATENT DOCUMENTS

| FR | 27 80 798 | 9/2003 |
| FR | 2 846 767 | 5/2004 |
| FR | 28 46 767 | 5/2004 |
| FR | 28 51 670 | 8/2004 |
| FR | 27 95 841 | 11/2004 |
| FR | 28 21 946 | 12/2006 |

OTHER PUBLICATIONS

Roggero, F. et al.: "Gradual deformation of Continuous Geostatistical Models for History Matching" pp. 221-236.
Hoffman, B. "Geostatistical History Matching Using a Regional Probability Perturbation Method" pp. 1-14.
Hu, L.Y., 2000a, "Gradual Deformation and Iterative Calibration of Gaussian-related Stochastic Models", *Mathematical Geology*, vol. 32, No. 2, 2000, pp. 87-108.

(Continued)

*Primary Examiner*—John Barlow
*Assistant Examiner*—Victor J. Taylor
(74) *Attorney, Agent, or Firm*—Antonelli, Terry, Stout & Kraus, LLP.

(57) ABSTRACT

A computer implemented method for forming an optimum stochastic model representative of the spatial distribution, in a heterogeneous underground zone, of physical quantities such as permeability and porosity, based upon measured dynamic data, representative of fluid displacements in a medium, using a continuous distribution parameterization technique is disclosed. The method has application for elaboration of an underground reservoir model by simulating the configuration of various heterogeneities: permeability, porosity, fractures, channels, etc.

19 Claims, 2 Drawing Sheets

OTHER PUBLICATIONS

Hu, L.Y., 2000b, "Gradual Deformation of Non-gaussian Stochastic Simulations", *Geostats 2000* Cape Town, WJ Kleingeld and DG Krige (eds.), 1, pp. 94-103.

Hu, L.Y., Blanc, G. and Noetinger, B., 2001, "Gradual Deformation and Iterative Calibration of Sequential Stochastic Simulations", *Mathematical Geology*, vol. 33, No. 4, 2001, pp. 475-489.

Hu, L.Y., 2003, "History Matching of Object-based Stochastic Reservoir Models". *Paper SPE 81503*, pp. 1-12.

Le Ravalec, M., Noetinger, B. and Hu, L.Y., 2000, "The EFT Moving Average (FFT-MA) Generator: An Efficient Numerical Method for Generating and Conditioning Gaussian Simulations", *Mathematical Geology*, vol. 32, No. 6, 2000, pp. 701-723.

La Ravalec, M., Hu, L.Y. and Noetinger, B., 2001, "Stochastic Reservoir Modeling Constrained to Dynamic Data: Local Calibration and Inference of Structural Parameters", *SPE Journal*, Mar. pp. 25-31.

Caers, J., 2002, "Geostatistical History Matching Under Training-image Based Geological Model Constraints", *Paper SPE 77429*, pp. 1-15.

Journel, A., 2002, "Combining Knowledge from Diverse Information Sources: An Alternative to Bayeslan Analysis," *Mathematical Geology*, vol. 34, No. 5, Jul. 2002 (© 2002), pp. 573-596.

\* cited by examiner

METHOD FOR FORMING AN OPTIMUM STOCHASTIC MODEL OF A HETEROGENEOUS UNDERGROUND ZONE, CALIBRATED WITH DYNAMIC DATA BY PARAMETRIZATION OF CONTINUOUS DISTRIBUTIONS

BACKGROUND OF THE INVENTION

The present invention relates to a computer implemented method for forming an optimum stochastic model representative of the spatial distribution of physical quantities in a heterogeneous underground zone, constrained by measured dynamic data, representative of fluid displacements in the medium, by parameterization of continuous distributions.

DESCRIPTION OF THE PRIOR ART

1.1 References

Reference will be made in the description hereafter to some of the following documents, which illustrate the state of the art:

Journel, A., and Huijbregts, C. J., 1978, Mining Geostatistics, Academic Press, London, 600 p.

Chiles, J. P., and Delfiner, P., 1999, Geostatistics: Modeling Spatial Uncertainty, Wiley, New York, 695 p.

Hu, L. Y., 2000a, Gradual Deformation and Iterative Calibration of Gaussian-Related Stochastic Models, Math. Geol., 32(1).

Hu, L. Y., 2000b, Gradual Deformation of Non-Gaussian Stochastic Models, Geostats 2000 Cape Town, W J Kleingeld and DG Krige (eds.), 1, 94-103.

Hu, L. Y., Blanc, G. and Noetinger, B., 2001, Gradual Deformation and Iterative Calibration of Sequential Stochastic Simulations, Math. Geol., 33(4).

Hu, L. Y., 2003, History Matching of Object-Based Stochastic Reservoir Models. Paper SPE 81503.

Le Ravalec, M., Noetinger, B. and Hu, L. Y., 2000, The FFT Moving Average (FFT-MA) Generator: An Efficient Numerical Method for Generating and Conditioning Gaussian Simulations, Math. Geol., 32(6).

Le Ravalec, M., Hu, L. Y. and Noetinger, B., 2001, Stochastic Reservoir Modeling Constrained to Dynamic Data: Local Calibration and Inference of the Structural Parameters, SPE Journal, March.

Roggero F. and Hu, L. Y., 1998, Gradual Deformation of Continuous Geostatistical Models for History Matching, Paper SPE 49004, Caers, J., 2002, Geostatistical History Matching Under Training-image Based Geological Model Constraints, Paper SPE 77429

Journel, A., 2002, Combining Knowledge from Diverse Information Sources: An Alternative to Bayesian Analysis, Math. Geol., 34(5)

Hoffman, B. T., Caers, J., 2003, Geostatistical History Matching Using a Regional Probability Perturbation Method, Paper SPE 84409.

1.2 Gradual Deformation Method

Various methods based on a gradual deformation scheme form the subject of the following patents or patent applications filed by the assignee: French Patents 2,780,798 2,795, 841, 2,821,946, and French Patent Applications 02/13,632 or 03/02,199, and of some of the aforementioned publications.

Realizations (geostatistical images) of Gaussian or Gaussian-related stochastic models are often used to represent the spatial distribution of some physical properties such as the permeability or the porosity in underground reservoirs. Inverse methods are then commonly used to constrain these realizations to data on which they depend non-linearly. This is notably the case in petroleum engineering or hydrology. These methods are based on the minimization of an objective function, also referred to as cost function, which measures the difference between the data measured in the field and the corresponding responses numerically simulated for the realizations representing the medium to be characterized. The goal is clearly to identify the realizations associated with the lowest objective function values, that is the most coherent realizations regarding the data.

The gradual deformation method was introduced by the aforementioned patents and the aforementioned publications as follows: Hu, 2000a; Le Ravalec et al., 2000. This geostatistical parameterization technique allows gradual modification of the realizations from a limited number of parameters. It is particularly well-suited to minimization problems because, when applied to realizations, it induces a continuous and regular variation of the objective function. In fact, minimization can be performed from the most advanced techniques, that is gradient techniques. The gradual deformation method has proved efficient for constraining oil reservoir models to production data. See Roggero and Hu (1998); Le Ravalec et al. (2001).

The gradual deformation method initially set up for Gaussian models has afterwards been extended to any type of stochastic models (see Hu, 2000b; Hu Blanc and Noetinger, 2001; Hu, 2003).

1.2-1 Reminders

The gradual deformation method applies for example to multi-Gaussian random functions. Let there be, for example, two independent random functions, $Y_1(x)$ and $Y_2(x)$, multi-Gaussian and stationary of order 2, where x represents the position vector. These two functions are assumed to have the same means and variances, that is 0 and 1, and the same covariance function. A new random function Y(t) is then constructed by combining $Y_1$ and $Y_2$ according to the expression as follows:

$$Y(t)=Y_1 \cos(t)+Y_2 \sin(t). \qquad (1)$$

It can be shown that, whatever the value of t, Y has the same mean, variance and covariance model as $Y_1$ and $Y_2$. Also, Y(t) is also a multi-Gaussian random function because it is the sum of two multi-Gaussian random functions.

According to this combination principle, a chain of realizations y(t) depending only on deformation parameter t can be constructed from two independent realizations $y_1$ and $y_2$ of $Y_1$ and $Y_2$. The basic concept of minimization processes using gradual deformation is to explore the chain of realizations and to determine the deformation parameter providing the realization which is the most compatible with the data measured in the field, that is the pressures, production rates, breakthrough times, etc. Since exploration of a single chain of realizations does generally not allow identification of a realization providing a sufficiently small objective function, the desired process is iterated. The optimum realization determined for the $1^{st}$ chain is then combined with a new independent realization of $Y_2$, and a new chain of realizations whose exploration can provide a realization which reduces the objective function even further is deduced therefrom, etc.

Instead of combining two independent realizations, relation (1) can be generalized by combining several independent realizations in order to increase the degree of freedom for the deformation of a realization as described in Roggero and Hu, (1998) and Hu, (2000) and patents filed by the assignee.

The gradual deformation algorithm described above within the Gaussian context applies more generally to any type of stochastic models according to the following principle defined in Hu, 2000b. Any stochastic simulation can be considered to be a deterministic operation that converts a series of numbers $U_1, U_2, U_3, \ldots U_N, \ldots$, independent of one another and distributed according to the uniform law, to a series of numbers structured according to the stochastic model. These uniform numbers can be converted to Gaussian variables $Y_1, Y_2, Y_3, \ldots Y_N, \ldots$, independent of one another, of mean 0 and of variance 1, by the relation:

$$Y_i = G^{-1}(U_i) \ i=1,2,3 \ldots$$

where $G^{-1}$ is the standardized Gaussian distribution function. Assuming this to be the case, the gradual deformation algorithm developed in a Gaussian context is going to be applied to the Gaussian vector $Y=(Y_1, Y_2, \ldots, Y_N \ldots)$, to construct a continuous chain of realizations of the uniform vector $U=(U_1, U_2, \ldots U_N \ldots)$. Given two independent realizations $y_1$ and $y_2$ of Y, the chain of realizations u(t) of vector U that is obtained is defined according to the relation:

$$u(t) = G(y_1 \cos t + y_2 \sin t) \quad (1a)$$

For each t, u(t) is a realization of vector U. Consequently, parameter t can be adjusted as in the Gaussian case so as to calibrate a realization with non-linear (dynamic) data. This procedure is iterated until a satisfactory calibration is obtained.

Application of the gradual deformation algorithm (1) to vectors $U=(U_1, U_2, \ldots U_N \ldots)$ and $Y=(Y_1, Y_2, \ldots, Y_N \ldots)$ (also referred to as white noises) allows to extend the deformation method to any type of stochastic models (continuous, facies or object models, etc.) as well as to the local deformation or in relation to the structural parameters of a model as developed in Hu, (2000).

1.3 Probability Perturbation Method

The probability perturbation method (PPM) is described in Caers (2002). PPM also comes within the scope of the construction of a model of a heterogeneous medium constrained by dynamic data, by optimization of an objective function. PPM is a parameterization technique different from the gradual deformation technique, allow gradual modification of the realizations from a limited number of parameters. PPM is based on an approximate conditional probability calculation formula (See Journel, 2002, supra) and on a discrete probability parameterization algorithm (See Caers, (2002)). So far, this technique is limited to the facies models (category models) generated by sequential simulation.

1.3-1 Reminders

The probability perturbation method applies to the facies models (category models) generated by sequential simulation. Let /(x) be the indicator function of the facies K of a stochastic model $$I(x) = \begin{cases} 1 & x \in K \\ 0 & x \notin K \end{cases} \quad (2)$$

Let A denote the event where facies K occurs at node x, that is $A=\{I(x)=1\}$; B the event of the facies in a vicinity of node x defined by the sequential simulation algorithm; and D the event of the production data.

According to an approximate formula proposed by Journel (2002), it is possible to calculate the probability of A knowing B and D as a function of the marginal probability of A, the conditional probability of A knowing B and the conditional probability of A knowing D:

$$P(A/B,D) = \frac{[1-P(A)]P(A/B)P(A/D)}{[1-P(A)]P(A/B)P(A/D) + P(A)[1-P(A/B)][1-P(A/D)]} \quad (3)$$

P(A) is known a priori, P(A/B) is calculated by the sequential simulation algorithm, whereas P(A/D) is defined by:

$$P(A/D) = (1-r)i^{(0)}(x) + rP(A) \quad (4)$$

where $i^{(0)}(x)$ is the indicator of facies K of the initial realization of the stochastic model and r the perturbation parameter ranging between 0 and 1. When r=0, the relationship obtained is $P(A/D)=i^{(0)}(x)$, which gives $P(A/B,D)=i^{(0)}(x)$. Consequently, the initial realization is also found during a generation of a realization of the stochastic model according to the probability P(A/B,D) and its complementary. On the other hand, when r=1, P(A/D)=P(A) and P(A/B,D)=P(A/B) is delivered therefrom. Consequently, the simulation according to P(A/B,D) yields a realization independent of the initial realization $i^{(0)}(x)$. It can be observed that, by fixing the random germ and by varying parameter r from 0 to 1, the initial realization $i^{(0)}(x)$ is gradually modified to another realization $i^{(1)}(x)$ independent of the first one. As in the case of the gradual deformation method, an objective function can thus be minimized in relation to parameter r in order to improve the calibration of a model with the production data. This procedure can also be iterated starting from a previously obtained realization and so on until a satisfactory calibration is obtained.

The previous parameterization technique according to the probability perturbation method thus constitutes an alternative to the gradual deformation method. However, this alternative is limited to the case of the facies models generated by sequential simulation and it requires the approximate formula (3).

SUMMARY OF THE INVENTION

The computer implemented method according to the invention provides formation of an optimum stochastic model representative of the spatial distribution, in a heterogeneous underground zone, of physical quantities such as the permeability and the porosity, constrained by measured dynamic data, representative of fluid displacements in a medium, and by imposing a continuity in the evolution of successive realizations of the model towards an optimum realization. It comprises an optimization by an iterative process of minimization of an objective function measuring, on each iteration, the difference between the dynamic data measured and dynamic data simulated by means of a flow simulator, obtained from a realization interpolated between a reference realization (the initial realization or the realization obtained at the end of the previous iteration) and another independent realization, by adjustment of a parameter, the iterative adjustment process being continued until an optimum realization of the stochastic model well-adjusted to the dynamic data is obtained and/or by gradual deformation of the model by carrying out a linear combination of independent realizations, the coefficients of this combination being such that the sum of their squares is 1.

The model is calibrated with the dynamic data by means of an iterative process of minimization of an objective function measuring, on each iteration, the difference between the dynamic data measured and dynamic data simulated by means of a flow simulator, obtained from a realization interpolated between a reference realization (initial or obtained at the end of the previous iteration) and another independent realization, by adjustment of a perturbation parameter, the iterative adjustment process being continued until an optimum realization of the stochastic model is obtained. The method applies in particular to Gaussian sequential simulations and, in particular, to Gaussian white noises, from which any type of stochastic models (continuous, facies or object models, etc.) can be constructed.

The method according to the invention applies notably to the construction of a model used to represent the spatial distribution, in an underground zone, of certain physical properties of the medium such as the permeability, the porosity, etc., calibrated with production data for example. A geostatistical representation of underground reservoirs is obtained allowing simulation of the configuration of various heterogeneities: permeability, porosity, fractures, channels, etc., which are very useful to reservoir engineers.

The method is distinguished in that, upon each iteration, an intermediate realization between the reference realization and another independent realization is constructed according to a continuous distribution perturbation algorithm.

According to an implementation mode, the intermediate realization is constructed by changing a parameter (r) which modifies the probability distribution.

According to an implementation mode, the intermediate realization is constructed by changing a parameter (t) controlling a gradual deformation of the model.

The method can apply for example to the formation of models generated by Gaussian sequential simulations or from Gaussian white noises.

In other words, the method according to the invention constitutes an extension of the discrete probability perturbation method (limited to the category models generated by sequential simulation).

It can apply to Gaussian white noises without any approximation being required. Consequently, the method applies to any type of stochastic model (including facies or object models). When it is applied to a facies model via a white noise, it differs from the probability perturbation method described above in that it requires no approximation. When it is applied to any type of stochastic model via white noises, the method constitutes an alternative to the gradual deformation method (also applicable to any type of stochastic model).

BRIEF DESCRIPTION OF THE DRAWINGS

Other features and advantages of the method according to the invention will be clear from reading the description hereafter, with reference to the accompanying drawings wherein.

DETAILED DESCRIPTION OF THE INVENTION

Figure 1:
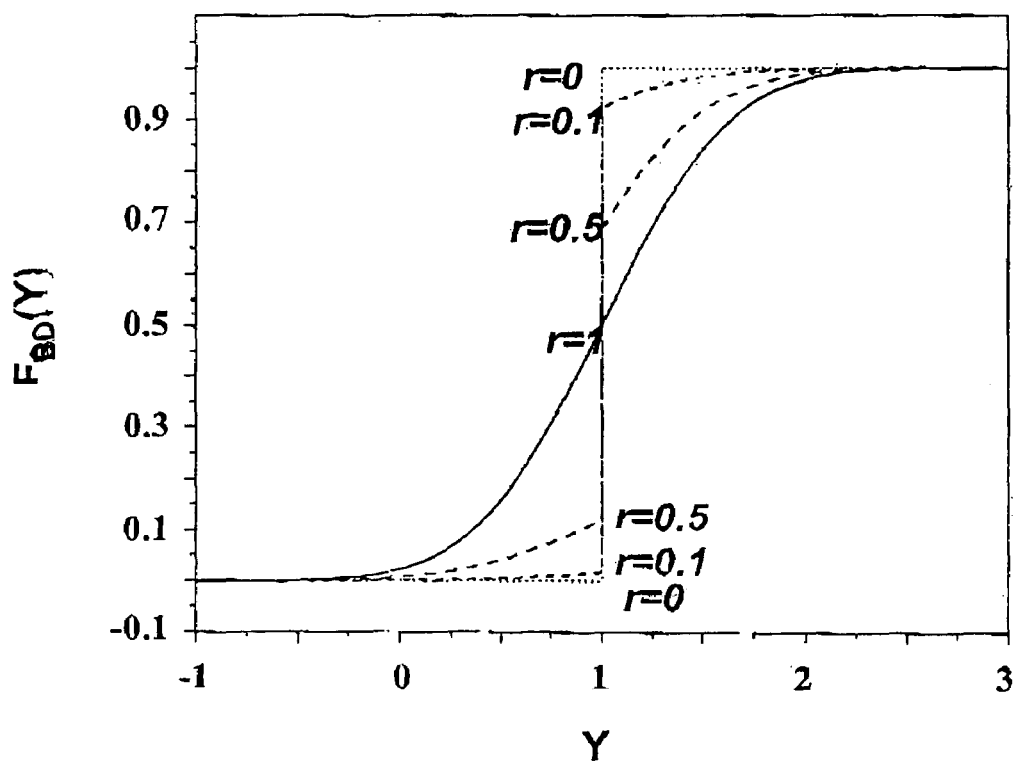
FIG. 1 shows an example of distribution perturbation for several values of perturbation parameter r in case of a Gaussian sequential simulation.

As stated above, the method according to the invention allows optimization of a heterogeneous underground zone, a stochastic model representative of the spatial distribution of quantities such as permeability, porosity, etc., in a heterogeneous underground zone, based upon dynamic data such as data representative of fluid displacements in the medium, obtained by means of tests in wells drilled through the zone for example, and by imposing a continuity in the evolution of realizations (geostatistical images or states) of the model. It comprises applying an iterative optimization technique according to which, from an initial realization of the model, an objective function measuring the difference between actually measured dynamic data and dynamic data simulated by means of a flow simulator is minimized on each iteration, on an interpolated realization, between a reference realization (initial realization at the start of the process or current realization obtained at the end of the previous iteration) and another independent realization. This minimization is performed by adjusting a perturbation parameter, according to a continuous distribution perturbation algorithm described below.

Continuous Distribution Perturbation Method

The existing discrete probability perturbation method according to equation (4) discussed, supra, is extended, within the scope of the present invention, to continuous models. Let Y(x) be a random function (not necessarily Gaussian) admitting the marginal distribution function F(y). Let A denote the event where Y(x) is less than a certain threshold y at node x, that is translated by the expression A={Y(x)<y}, B the variables vector in a vicinity of node x defined by the sequential simulation algorithm and D the event (in the sense of the probability theory) of the values taken by the production data considered as a random (uncertain) vector.

The following relationships are used:

$$P(A)=F(y)$$

$$P(A/B)=F_B(y)$$

The following relationship is defined:

$$P(A/D)=F_D(y)=(1-r)1^{y>y_0}+rF(y) \quad (5)$$

where $y_0$ is the initial realization of Y(x) at node x, and where:

$$1_{y>y_0} = \begin{cases} 1 & y > y_0 \\ 0 & y \le y_0 \end{cases} \quad (6)$$

is an indicator function of realization $y_0$.

The distribution function $F_{B,D}(Y)$ of Y(x) can be obtained by means of the approximate formula (3), knowing B and D as a function of F(y), $F_B(y)$ and $F_D(y)$. It is checked that, when r=0, $F_{B,D}(y)=1_{y>y_0}$. Consequently, the initial realization is also found upon generation of a realization of the stochastic model according to the law $F_{B,D}(y)$. When r=1, $F_{B,D}(y)=F_B(y)$ is obtained. Consequently, the simulation according to $F_{B,D}(y)$ yields to a realization of Y(x) independent of the initial realization $y_0(x)$. It is observed that, by fixing the random germ and by varying parameter r from 0 to 1, the initial realization $y_0(x)$ is gradually modified towards another Gaussian realization $y_1(x)$ independent of the first one.

Application to Gaussian Sequential Simulations

The continuous distribution perturbation method applies in particular to the continuous models generated by Gaussian sequential simulation. Let now Y(x) be a multi-Gaussian random function. The relationship is obtained $$P(A) = G(y) \quad (7)$$

$$P(A/B) = F_B(y) = G\left(\frac{y-m}{\sigma}\right)$$

$$P(A/D) = F_D(y) = (1-r)1_{y>y_0} + rG(y)$$

where G is the centered and reduced Gaussian distribution function, m and $\sigma^2$ are respectively the kriging and the kriging variance of Y(x) from data B. By means of formula (3), the relationship is obtained:

$$P(A/B, D) = F_{B,D}(y) \quad (8)$$

$$= \begin{cases} \dfrac{r[1-G(y)]G\left(\frac{y-m}{\sigma}\right)}{1-rG(y)-(1-r)G\left(\frac{y-m}{\sigma}\right)} & y \le y_0 \\[2ex] \dfrac{[1-r+rG(y)]G\left(\frac{y-m}{\sigma}\right)}{rG(y)+(1-r)G\left(\frac{y-m}{\sigma}\right)} & y > y_0 \end{cases}$$

This monovariable law is simulated according to the acceptance and rejection algorithm, the distribution function numerical inversion algorithm or another monovariable law simulation algorithm. FIG. 1 shows an example of distribution (8) for several values of perturbation parameter r.

Application to Gaussian White Noises

In the particular case where Y(x) is a Gaussian white noise (Gaussian random function (or vector) without spatial correlation), event B provides no information for event A and distribution function (8) is simplified as follows:

$$F_{B,D}(y) = \begin{cases} rG(y) & y \le y_0 \\ 1-r+rG(y) & y > y_0 \end{cases} \quad (9)$$

It can be noted that this distribution is also obtained without going through approximate formula (3). In fact, since event B brings no information for event A, the following relationship is directly obtained:

$$F_{B,D}(y) = F_D(y) = (1-r)1_{y>y_0} + rG(y) = \begin{cases} rG(y) & y \le y_0 \\ 1-r+rG(y) & y > y_0 \end{cases}$$

Figure 2:
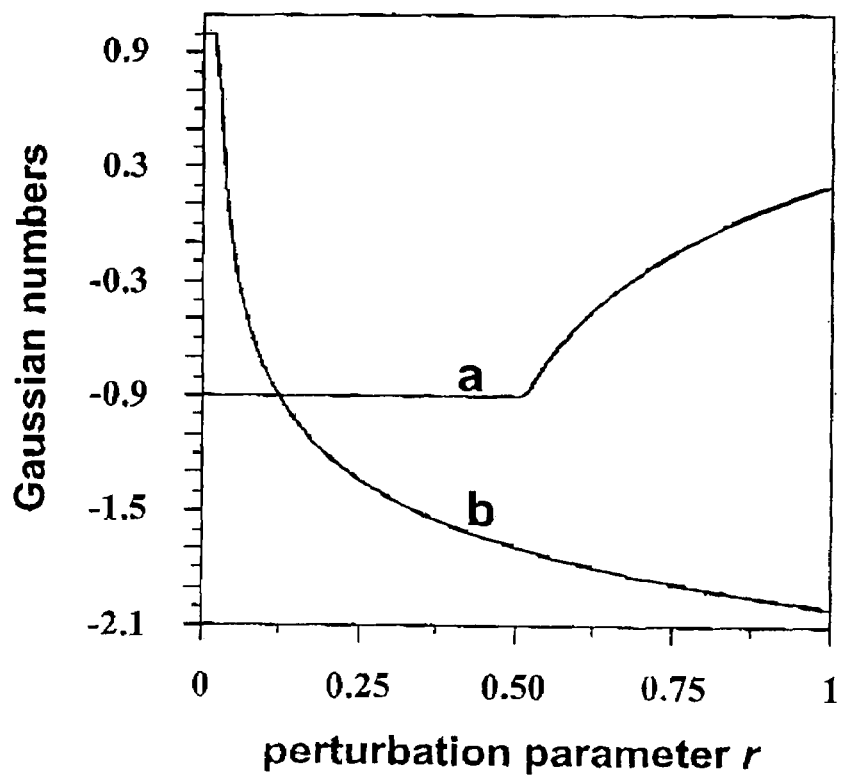
FIG. 2 shows an example of evolution of two Gaussian numbers towards two other Gaussian numbers as a function of perturbation parameter r in case of perturbation of a Gaussian white noise.

It can be shown that, for any value of r, the interpolation, according to perturbation algorithm (9), between two independent Gaussian white noises remains a Gaussian white noise. The continuous distribution perturbation method applied to white noises is no longer an approximate method, unlike its application to other situations and the probability perturbation method (Caers, (2002)). For a fixed value of r, the simulation algorithm of law (9) is as follows:

1. generate a standard Gaussian white noise $y_0(x)$,
2. generate a uniform white noise u(x)

if $rG[y_0(x)] < u(x) < 1-r+rG[y_0(x)]$, then $y(x) = y_0(x)$ if $u(x) < rG[y_0(x)]$, then $y(x) = G^{-1}\left(\frac{u(x)}{r}\right)$ if $u(x) > 1-r+rG[y_0(x)]$, then $y(x) = G^{-1}\left(\frac{u(x)+r-1}{r}\right)$ It is shown that y(x) thus generated is a Gaussian white noise. FIG. 2 shows the evolution of two Gaussian numbers towards two other Gaussian numbers as a function of perturbation parameter r according to the previous algorithm.

Parameterization according to relation (9) thus allows modification of an initial white noise towards another white noise independent of the first one. This modification considers all the characteristics of the Gaussian white noise. As explained above when describing the mechanisms of the gradual deformation method, parameterization according to relation (9) can be applied as an alternative to parameterization according to the gradual deformation method, in order to modify, in a coherent way, globally or locally, any type of stochastic simulation.

Iterative Calibration Procedure

As in the case of the gradual deformation method, the continuous distribution perturbation method is naturally integrated in the minimization processes. The optimization procedure translates into the successive exploration of continuous chains of realizations made from an initial realization or from the optimum realization determined for the chain of realizations formed at the end of the previous iteration, and a second realization randomly generated for each chain. This desired process is iterated until the objective function is considered to be small enough and the resulting geostatistical image of the underground zone best corresponds to the measured dynamic data.

Use with the Gradual Deformation Method

The method according to the invention can be used jointly with the gradual deformation method. In fact, from an initial realization or from the optimum realization obtained at the end of the previous iteration, a new chain can be constructed of realizations as a function of the following two parameters: parameter r of relation (9) which modifies the probability distribution and parameter t of relation (1a) which modifies the uniform number for sampling this distribution. Then these two parameters can simultaneously be performed to improve calibration with the production data, which gives one more degree of freedom in relation to the use of the distribution perturbation method or of the gradual deformation method alone. As before, the process is iterated until calibration with the production data is considered to be satisfactory enough.

Figure 3:
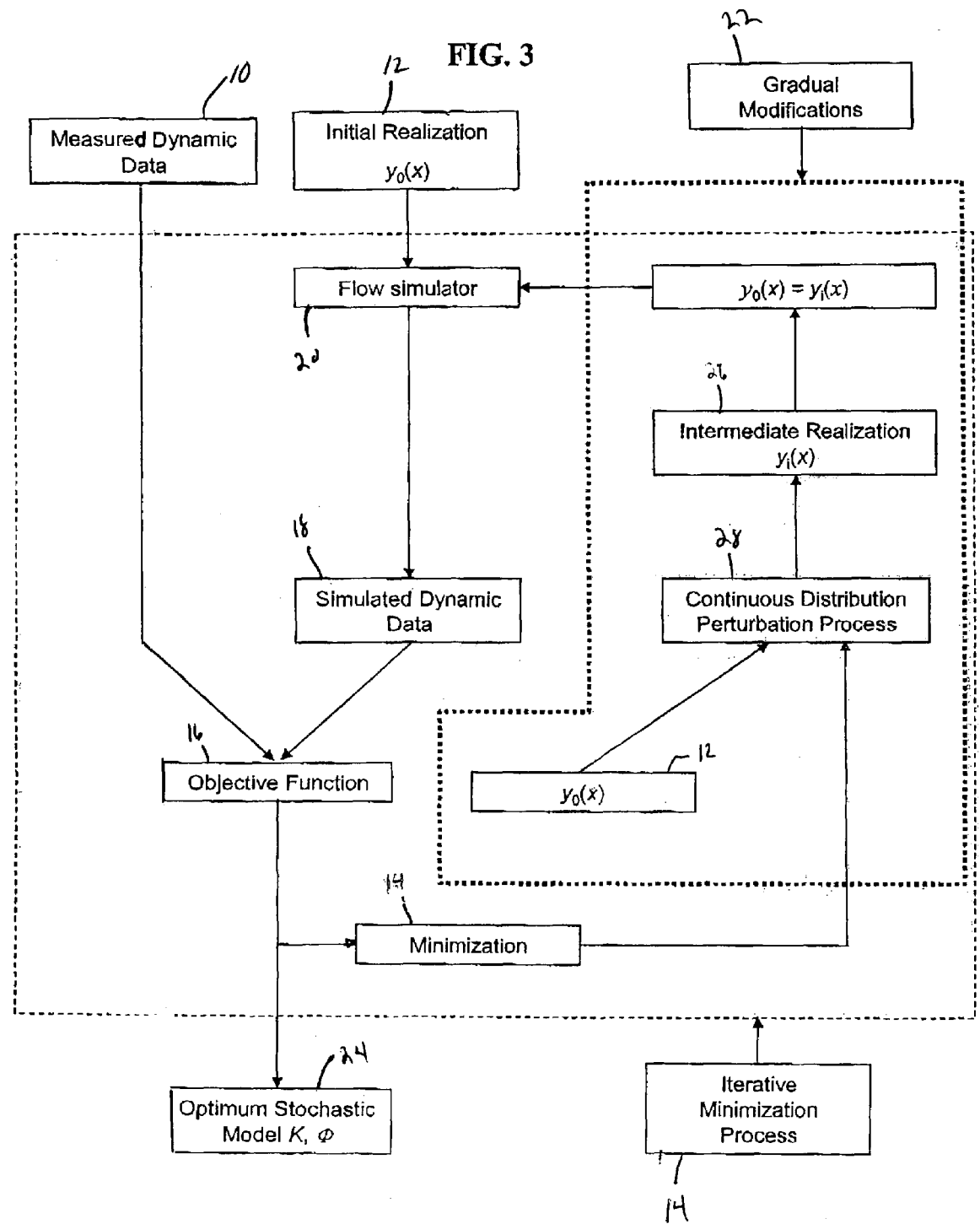
FIG. 3 is a flow chart of the method of the invention for forming an optimum stochastic model representative of the spatial distribution in a heterogeneous underground zone.

FIG. 3 illustrates a method for forming an optimum stochastic model representative of a spatial distribution, in a heterogeneous underground zone, of physical quantities, based upon measured dynamic data 10 representative of fluid displacements in the medium. The method includes simulating an initial realization $y_0(x)$ 12 of the stochastic model, optimizing the initial realization by means of an iterative minimization process 4 of an objective function 16, measuring on each iteration, a difference between the measured dynamic data 10 and simulated dynamic data 18, the simulated dynamic data being simulated using a flow simulator 20. The optimization comprises gradual modifications 22 which gradually modify the initial realization towards an optimum realization 24. The gradual modification, upon each iteration, comprises constructing an intermediate realization 26 utilizing a continuous distribution perturbation process 28 applied to the initial realization $y_1(x)$ 12 and gradually modifying the initial realization by the intermediate realization $y_i(x)$ 26.

While the invention has been described in terms of its preferred embodiments, numerous modifications may be made to the invention without departing from its spirit and scope.

The invention claimed is:

1. A method for forming an optimum stochastic model representative of a spatial distribution, in a heterogeneous underground zone, of at least one physical quantity based upon measured dynamic data, representative of fluid displacements in a medium, obtained from the underground zone, comprising simulating an initial realization of the stochastic model, optimizing that initial realization by means of an iterative minimization process of an objective function, measuring, on each iteration, a difference between the measured dynamic data and simulated dynamic data, the simulated dynamic data being simulated using a flow simulator, and wherein the optimization comprises gradually modifying the initial realization towards an optimum realization, wherein the gradual modification, upon each iteration, comprises:
    constructing an intermediate realization utilizing a continuous distribution perturbation process applied to the initial realization; and
    gradually modifying the initial realization by replacing the initial realization by the intermediate realization.

2. A method as claimed in claim 1, wherein construction of the intermediate realization comprises a deformation of the model according to the gradual deformation method, by carrying out a linear combination of independent realizations, the coefficients of the linear combination having a sum of the squares of the coefficients being 1.

3. A method as claimed in claim 2, wherein the intermediate realization is constructed by changing a parameter controlling the gradual deformation of the model.

4. A method as claimed in claim 2, wherein the model is generated by a Gaussian sequential simulation.

5. A method as claimed in claim 3, wherein the model is generated by a Gaussian sequential simulation.

6. A method as claimed in claim 3 wherein the model is generated from Gaussian white noises.

7. A method as claimed in claim 4 wherein the model is generated from Gaussian white noises.

8. A method as claimed in claim 1, wherein the at least one physical quantities comprises at least one of permeability and porosity.

9. A method as claimed in claim 2, wherein the at least one physical quantities comprises at least one of permeability and porosity.

10. A method as claimed in claim 3, wherein the at least one physical quantities comprises at least one of permeability and porosity.

11. A method as claimed in claim 4, wherein the at least one physical quantities comprises at least one of permeability and porosity.

12. A method as claimed in claim 5, wherein the at least one physical quantities comprises at least one of permeability and porosity.

13. A method as claimed in claim 6, wherein the at least one physical quantities comprises at least one of permeability and porosity.

14. A method as claimed in claim 1, wherein the at least one physical quantities comprises at least one of permeability and porosity.

15. A method as claimed in claim 1, wherein the medium is obtained by drilling through the zone.

16. A method as claimed in claim 2, wherein the medium is obtained by drilling through the zone.

17. A method as claimed in claim 2, wherein the medium is obtained by drilling through the zone.

18. A method as claimed in claim 4, wherein the medium is obtained by drilling through the zone.

19. A method as claimed in claim 5, wherein the medium is obtained by drilling through the zone.

* * * * *